US011643315B2

(12) United States Patent
Franceschini et al.

(10) Patent No.: US 11,643,315 B2
(45) Date of Patent: May 9, 2023

(54) MACHINE FOR FILLING CONTAINERS OF TWO DIFFERENT TYPES WITH A LIQUID SUBSTANCE, IN PARTICULAR WITH A BEVERAGE

(71) Applicant: KOSME S.R.L. UNIPERSONALE, Roverbella (IT)

(72) Inventors: Gianluca Franceschini, Marmirolo (IT); Martino Alberti, Roverbella (IT)

(73) Assignee: KOSME S.R.L. UNIPERSONALE, Roverbella (IT)

( * ) Notice: Subject to any disclaimer, the term of this patent is extended or adjusted under 35 U.S.C. 154(b) by 0 days.

(21) Appl. No.: 17/332,281

(22) Filed: May 27, 2021

(65) Prior Publication Data

US 2021/0380388 A1 Dec. 9, 2021

(30) Foreign Application Priority Data

Jun. 5, 2020 (IT) .......................... 102020000013465

(51) Int. Cl.
*B67C 3/26* (2006.01)
*B65G 47/04* (2006.01)
*B65G 47/34* (2006.01)

(52) U.S. Cl.
CPC ................ *B67C 3/26* (2013.01); *B65G 47/04* (2013.01); *B65G 47/34* (2013.01); *B67C 2003/2657* (2013.01)

(58) Field of Classification Search
CPC .. B67C 3/00; B67C 3/02; B67C 3/225; B67C 3/24; B67C 3/26; B67C 2003/2657

(Continued)

(56) References Cited

U.S. PATENT DOCUMENTS 2,645,401 A 7/1953 Kerr
4,674,547 A 6/1987 Simonazzi
(Continued)

FOREIGN PATENT DOCUMENTS

EP 0336063 A2 10/1989
EP 0336063 A3 3/1990
(Continued)

*Primary Examiner* — Chelsea E Stinson
(74) *Attorney, Agent, or Firm* — Pearne & Gordon LLP; J. Gregory Chrisman

(57) ABSTRACT

A machine (100) for filling containers (90) of a first type and for filling containers (95) of a second type comprises a carousel filler (1), a first device (11) for loading the containers onto the carousel filler (1), a second device (12) for removing the containers (90) of the first type from the carousel filler (1), and a third device (3) for removing the containers (95) of the second type from the carousel filler (1). The carousel filler (1) is equipped with a plurality of filling units (2), each comprising a plate (21) for resting one of the containers and a filling head (22) for filling that container. The first device (11), the second device (12) and the third device (3) are positioned in respective angular positions on a circumferential path of the carousel filler (1), the third device (3) being between the first device (11) and the second device (12). The third device (3) in an operating condition removes the containers on the plates (21) passing through the angular position of the third device (3), whereas the third device (3) in a non-operating condition allows the containers on the passing-through plates (21) to continue towards the second device (12).

15 Claims, 10 Drawing Sheets

(58) Field of Classification Search
USPC .......................................... 53/467, 471, 473
See application file for complete search history.

(56) References Cited

U.S. PATENT DOCUMENTS

| | | |
|---|---|---|
| 5,125,441 A | 6/1992 | Mette |
| 7,287,562 B2 | 10/2007 | Tanikawa et al. |
| 8,726,946 B2 | 5/2014 | ClÜSserath et al. |
| 10,005,653 B2 | 6/2018 | Clusserath et al. |
| 10,214,406 B2 | 2/2019 | DiCarlo et al. |
| 10,968,091 B2 | 4/2021 | Krulitsch |
| 11,008,204 B2 | 5/2021 | Nishino et al. |
| 2005/0172580 A1 | 8/2005 | Krulitsch |
| 2005/0178466 A1 | 8/2005 | Tanikawa et al. |
| 2010/0071802 A1 | 3/2010 | Clusserath et al. |
| 2013/0240081 A1 | 9/2013 | Balzarin et al. |
| 2014/0283947 A1 | 9/2014 | Wagner |
| 2016/0332859 A1* | 11/2016 | Clüsserath ........... B65G 47/846 |
| 2017/0001848 A1 | 1/2017 | DiCarlo et al. |
| 2017/0096320 A1* | 4/2017 | Zoni ........................ B65C 9/40 |
| 2017/0158482 A1* | 6/2017 | Bondi ....................... B67C 3/24 |
| 2019/0144251 A1 | 5/2019 | DiCarlo et al. |
| 2019/0152754 A1 | 5/2019 | Nishino et al. |
| 2021/0380385 A1 | 12/2021 | Franceschini |
| 2021/0380386 A1 | 12/2021 | Franceschini |
| 2021/0380387 A1 | 12/2021 | Franceschini |

FOREIGN PATENT DOCUMENTS

| | | |
|---|---|---|
| EP | 1564180 A1 | 8/2005 |
| EP | 2930140 A1 | 10/2015 |
| JP | 2002370797 A | 12/2002 |
| WO | 2018100004 A1 | 6/2018 |

\* cited by examiner

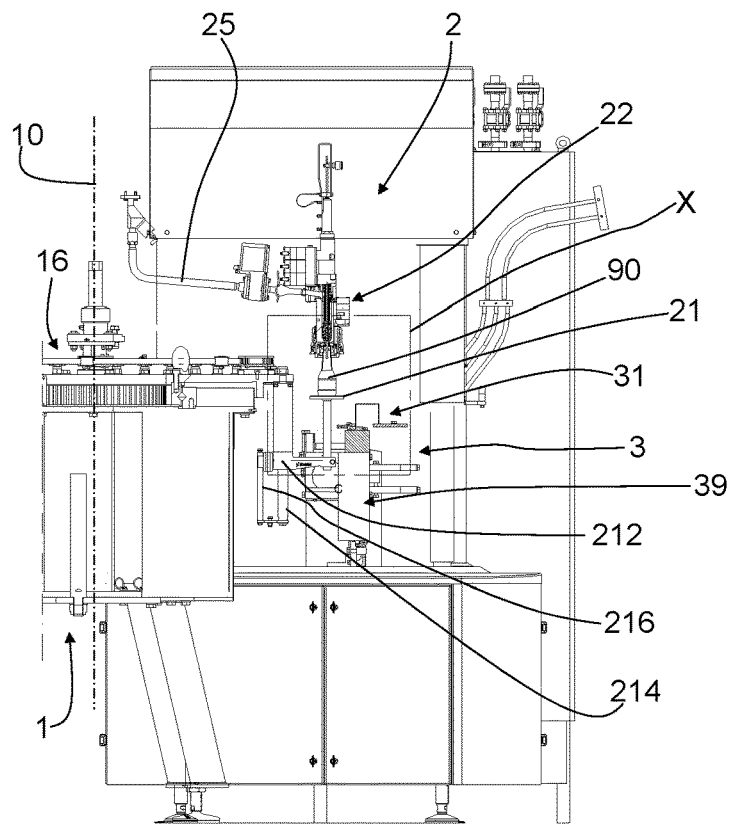
FIG. 9
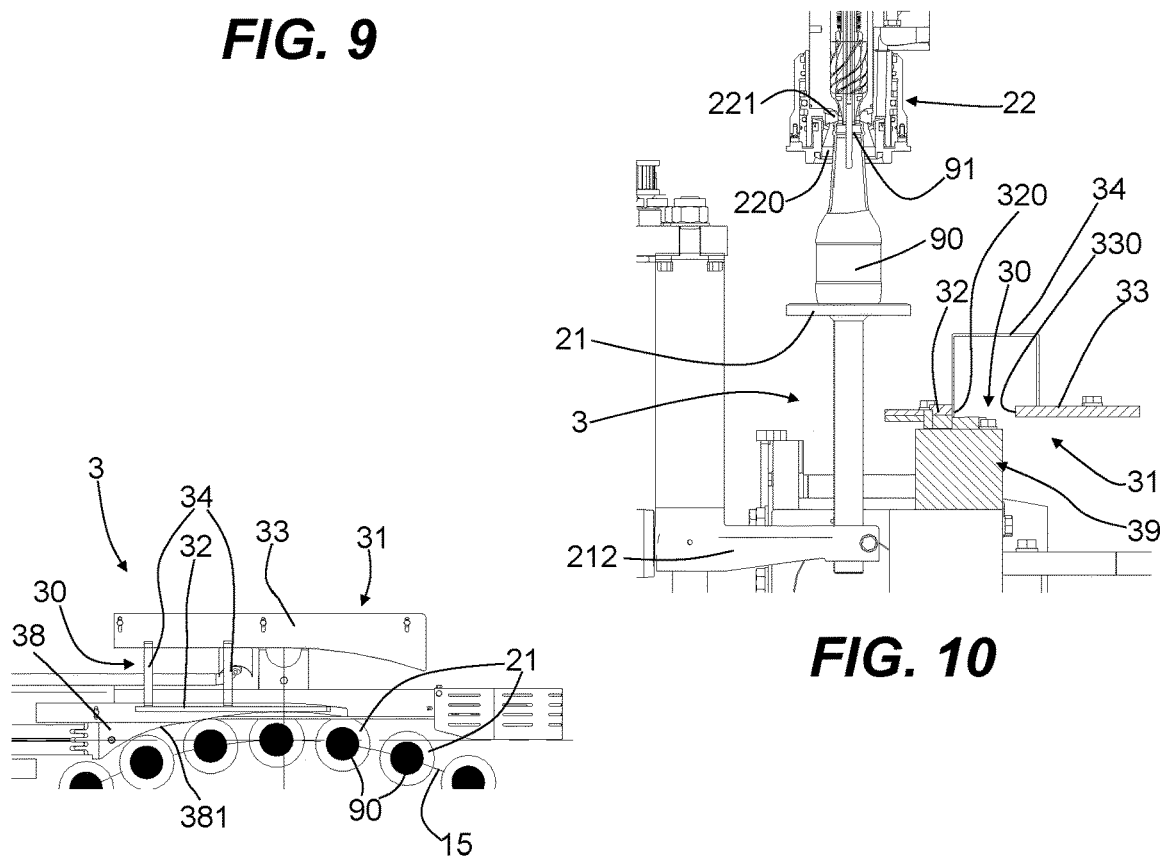
FIG. 10
FIG. 11

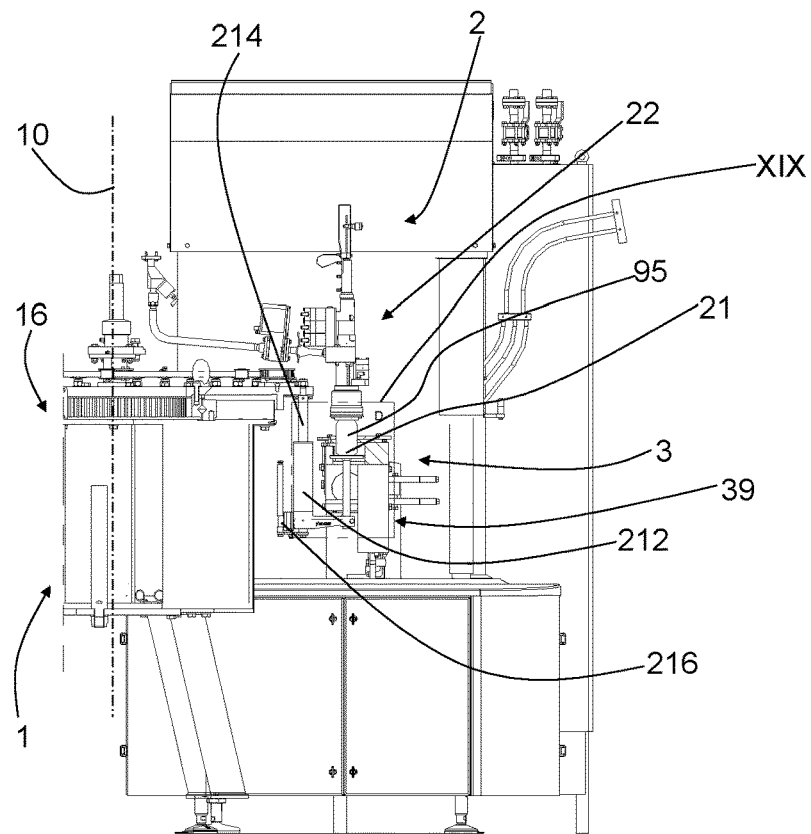
FIG. 18
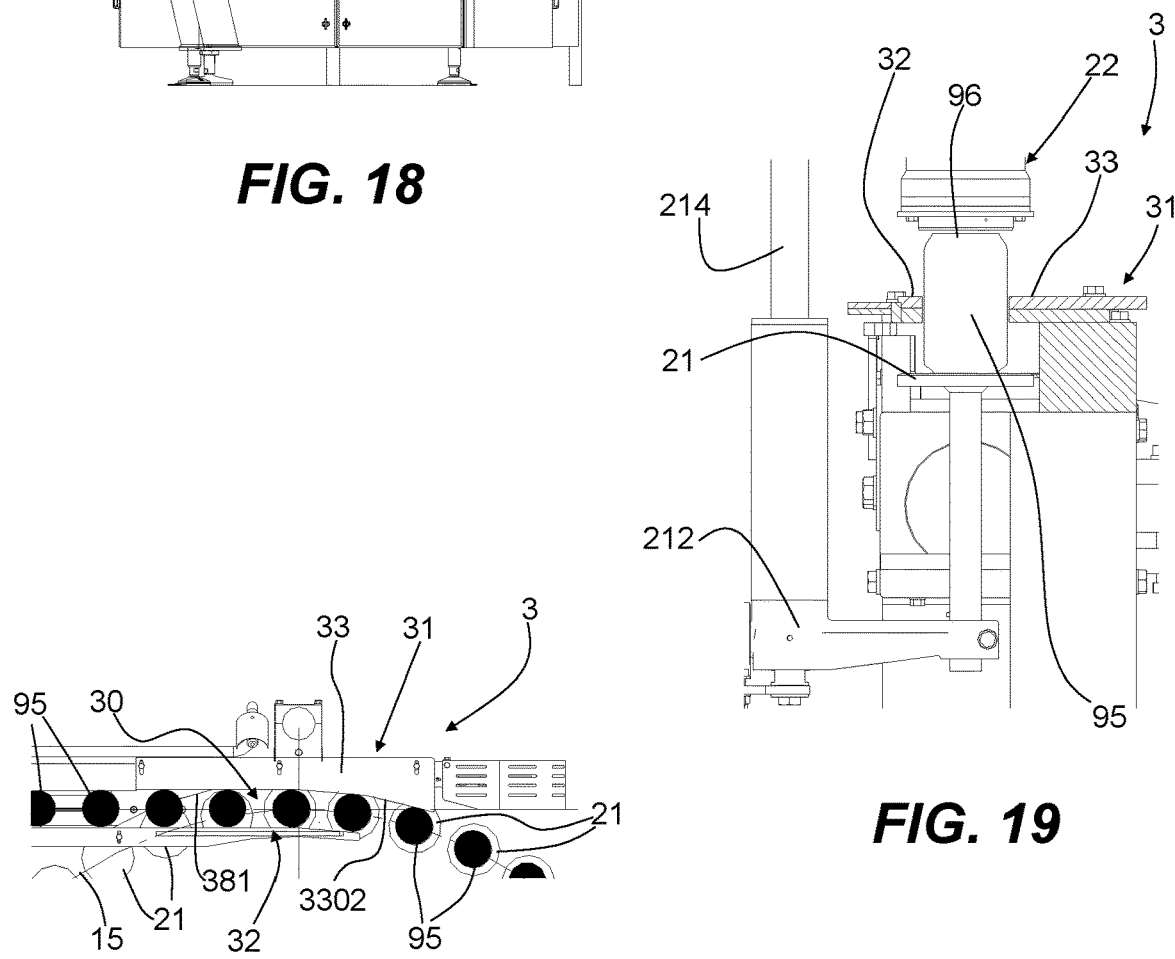
FIG. 19
FIG. 20

MACHINE FOR FILLING CONTAINERS OF TWO DIFFERENT TYPES WITH A LIQUID SUBSTANCE, IN PARTICULAR WITH A BEVERAGE

This invention relates in general to the sector of apparatuses for filling containers, in particular for filling bottles and cans with a liquid substance such as a beverage.

Specifically, this invention relates to a machine which can be used for filling two different types of containers, which in particular are bottles and cans, with the liquid substance, which in particular is a beverage.

Modern apparatuses for filling containers are usually automated machines which operate with high production capacities, which are measured in terms of thousands (or even tens of thousands) of containers per hour. In order to be able to operate without hitches at such high speeds, the machine has to be perfectly configured and adjusted for the specific model of container to be filled, in terms of shape, dimensions and mechanical properties of the specific container.

In the sector it is well known that performing a "format change-over", that is to say, adapting and adjusting the filling machine so that it can process a different model of container, is usually quite laborious, involving the substitution of machine components (for example, gaskets for making a seal with the container, sensors, parts of devices for moving the containers, control systems), and requires some machine downtime. This disadvantage may be even more serious for machines which, in order to offer higher productivity, are equipped with a large number of filling units. Indeed, each filling unit must be reconfigured and calibrated for the container model, therefore the time and manpower needed are in proportion to the number of filling units.

Moreover, filling machines are generally divided into two categories: machines for filling bottles and machines for filling cans. Given the great technical diversity between these two types of containers, it is not usually possible (or in any case it is quite laborious) to reconfigure a machine initially designed for filling bottles so that it can be used for filling cans, and vice versa.

Moreover, containers of different types may require different processing operations after filling, in particular as regards closing of the containers: for example, the capping operation for a bottle is completely different from the sealing operation for a can. These processing operations are carried out by different apparatuses and that further complicates the use of a same machine for filling two different types of container.

The disadvantages mentioned greatly limit the flexibility of use of a filling machine in a production line and are particularly disadvantageous for a production line which, based on market demand, must frequently switch from one format to another.

For example, some manufacturers of beverages (such as carbonated beverages and beer) sell the same product both in bottles and cans. The need for a filling line dedicated to bottles and a filling line dedicated to cans, or alternatively the need for long machine downtimes for a change-over of the type of container, may be serious disadvantages and involve significant costs for beverage manufacturers.

These disadvantages have already been partly dealt with in the sector. In particular machines have been proposed whose filling units can be used for cans or bottles, subject to a reduced number of operations to be carried out. For some of those machines, the filling units are already set up with a first gasket, for making a seal with the mouth of a bottle, and with a second gasket, for making a seal with the mouth of a can. However, such machines are often trade-off solutions which are not completely effective and which cannot fully take into account the distinctive features of and differences between the filling of bottles and the filling of cans.

Moreover, even in such machines the difficulty remains of allowing the machine to manage the cans and the bottles differently after filling in order to perform the closing of the containers. Furthermore, it must be considered that in a production line there is often the need to limit as far as possible the space occupied by the machine.

Therefore, in the prior art there is room for solutions providing improvements which make the filling of bottles and cans using a same machine easier and more effective.

In this context the technical purpose which forms the basis of this invention is to provide a machine for filling containers which allows to overcome the above-mentioned disadvantages of the prior art or which at least offers an alternative solution to the known ones.

The technical purpose and the aims indicated are substantially achieved by a machine for filling containers with a liquid substance, made in accordance with claim 1. Particular embodiments of this invention are defined in the corresponding dependent claims.

According to one aspect of this invention, the machine comprises a carousel filler, a device for loading the containers onto the filler, a device for removing the containers of the first type (for example, bottles), a device for removing the containers of the second type (for example, cans). The three devices are in different positions on the circumferential path of the filler and in particular the device for the containers of the second type is interposed between the other two.

The device for the containers of the second type may assume a non-operating condition, in which it allows the containers to pass on the filler, and an operating condition, in which it removes the containers from the filler and moves them onto a separate line. That is useful because the path of the containers in the machine is easily modifiable, depending on the type of containers to be filled, by acting on the device for the containers of the second type.

One particular embodiment of that device, in which there is a conveying lane which is made in a body movable between two positions, has proved useful due to its effectiveness and simple construction.

In a particular mode of use of the machine, the device for removing the containers of the first type can be used to load the containers of the second type. That is useful for extending the path of the containers of the second type in the filler in order to have more time for the filling, partly making up for the difference compared to the path of the containers of the first type.

Further features and the advantages of this invention will be more apparent from the detailed description of an embodiment of a machine for filling containers with a liquid substance, presented by way of example and non-limiting.

Reference will be made to the figures of the accompanying drawings, in which:

FIG. 9 is a side view of the part of the machine in FIG. 5;

FIG. 10 is a view, enlarged and partly in cross-section, of a detail X of FIG. 9;

FIG. 11 shows an enlarged detail of FIG. 1;

FIG. 18 is a side view of the part of the machine in FIG. 12;

FIG. 19 is a view, enlarged and partly in cross-section, of a detail XIX of FIG. 18;

FIG. 20 shows an enlarged detail of FIG. 2;

Figure 1:
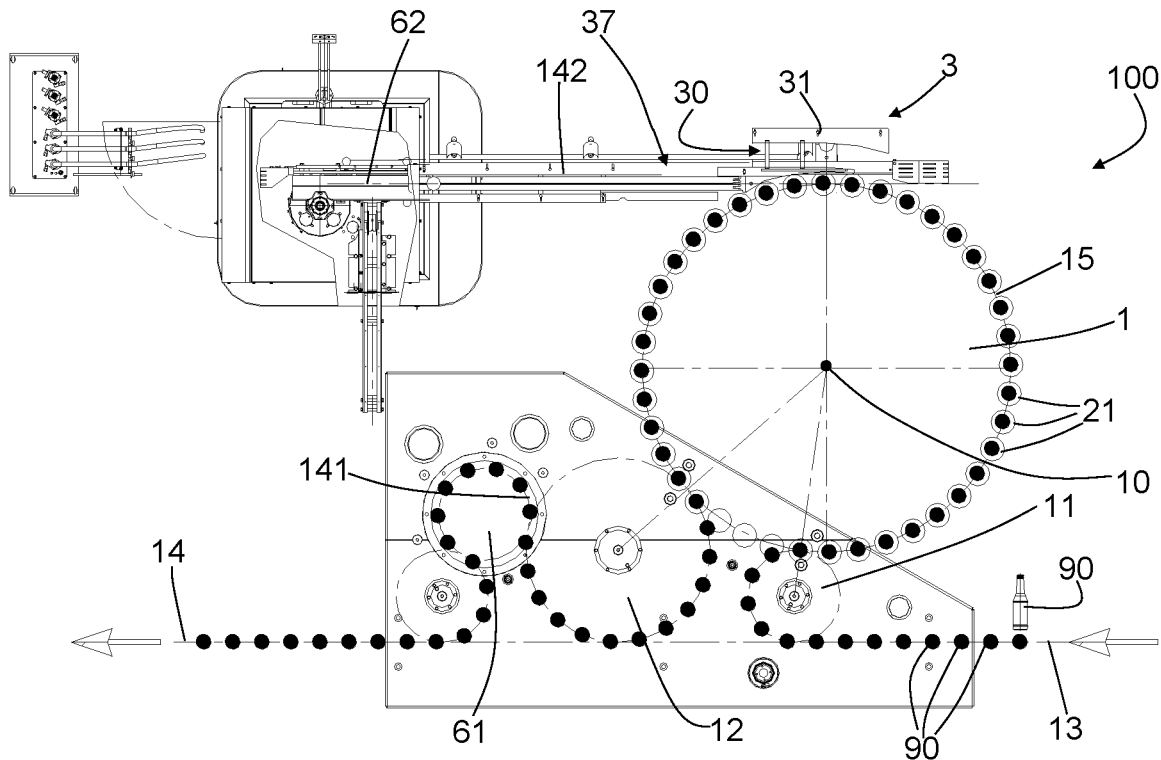
FIG. 1 is a simplified top view of a machine according to this invention, in a first operating mode for containers of a first type.

With reference to the accompanying figures, a machine according to this invention is indicated with the reference number 100. The machine 100 is designed to be used for filling containers with a liquid substance, which in particular is a beverage and more particularly is a carbonated beverage.

As will become clearer below, the machine 100 can be used, and is configured, to fill containers of a first types and to fill containers of a second type. For example, the two types of containers differ in terms of the dimensions of the mouth of the container, the dimensions of the container, and/or the material used to make the container. Specifically, the containers of the first type are bottles 90 (for example made of glass or plastic, PET or HDPE), the containers of the second type are cans 95 (made of metal, for example aluminium).

The machine 100 comprises a carousel filler 1, rotatable about an axis of rotation 10 (which in particular is a vertical axis) and equipped with a plurality of filling units 2 (for example, it comprises forty of said units).

Each filling unit 2 comprises a plate 21, which forms a resting surface 210 for a bottom of a container to be filled, and a filling head 22 that is configured to receive a mouth of the container to be filled and to dispense the liquid substance towards an internal volume of the container. Therefore, during the filling, each container is contained between a filling head 22 and the respective plate 21.

Each filling unit 2 is configured to fill containers 90 of the first type and to fill containers 95 of the second type.

The filling head 22 has a housing 220 facing towards the respective plate 21. The housing 220 forms a cavity which opens towards the plate 21 (that is to say, downwards) and is designed to receive a mouth of the container on the plate 21.

The housing 220 is fitted with a first annular gasket 221, which is designed to come into contact with a mouth 91 of a container 90 of the first type, and a second annular gasket 222, which is designed to come into contact with a mouth 96 of a container 95 of the second type. Basically, the annular gasket 221, 222 makes contact with an edge of the mouth of the respective container and makes a seal with it. Thanks to the presence of the two annular gaskets 221, 222, as well as the shape and dimensions of the cavity formed by the housing 220, the filling head 22 is configured to receive the mouth 91 of a container 90 of the first type and, alternatively, the mouth 96 of a container 95 of the second type. During the filling, the container 90, 95 is locked between the plate 21 and the corresponding annular gasket 221, 222 of the housing 220.

In the embodiment illustrated, the first annular gasket 221 is smaller in size than the second annular gasket 222 (in particular, since the gaskets are circular, the first annular gasket 221 has a smaller diameter than the second annular gasket 222) and is positioned closer to the bottom of the housing 220. In one possible embodiment, as an alternative to the embodiment shown where both of the annular gaskets 221, 222 are simultaneously present, one of the two annular gaskets 221, 222 could be mounted on a part which is removable and interchangeable when necessary.

The filling head 22 also comprises a dispenser 23 which opens onto the housing 220 and has a dispensing opening which, in use, faces towards the mouth 91, 96 of the container 90, 95 so as to dispense the liquid substance towards the internal volume of the container 90, 95. Furthermore, the filling head 22 comprises a valve 24 which is interposed between a feed duct 25 and the dispensing opening of the dispenser 23. The valve 24 is controllable to assume an open position and a closed position: in the open position, the valve 24 allows the passage of the liquid substance and its dispensing from the dispenser 23; in the closed position, the valve 24 closes the passage and prevents the dispensing of the liquid substance. The valve 24 is controlled by a control system and the filling head 22 comprises a measuring system (in particular, a level sensor 251 and a volume meter 252) for detecting the degree of filling of the container, on the basis of which the valve 24 is controlled.

The aspects of operation of the valve 24 themselves are similar to the prior art and therefore do not require further description.

The filling head 22 also comprises circuits for cleaning in place, for flushing with carbon dioxide, for pressurisation and for creating vacuum in the container.

Other aspects of the operation of the filling head 22 are not relevant to this invention and are not described in further detail.

The plate 21 is movable towards or, vice versa, away from the filling head 22. That movement varies the distance between the resting surface 210 and the annular gaskets 221, 222. For this purpose, the plate 21 is mounted on a support 212 which is slidably mounted on a fixed structure 214. The fixed structure 214 has an actuator 216 for moving the support 212 and therefore the plate 21. Specifically, the line of movement of the plate 21 is vertical.

The filling heads 22 and the respective plates 21 are positioned on the periphery of the carousel filler 1 and, as the carousel filler 1 rotates about the axis of rotation 10, they move along a circumferential path 15 about the axis 10.

The carousel filler 1 comprises a lower part 16, on which the fixed structures 214 of the plates 21 and therefore the plates 21 themselves are mounted, and an upper part 17, on which the filling heads 22 and the feed ducts 25 of the filling heads 22 are mounted.

The upper part 17 rotates jointly with the lower part 16 about the axis of rotation 10 and is movable relative to the lower part 16 by a translation along the axis 10 itself.

Figure 5:
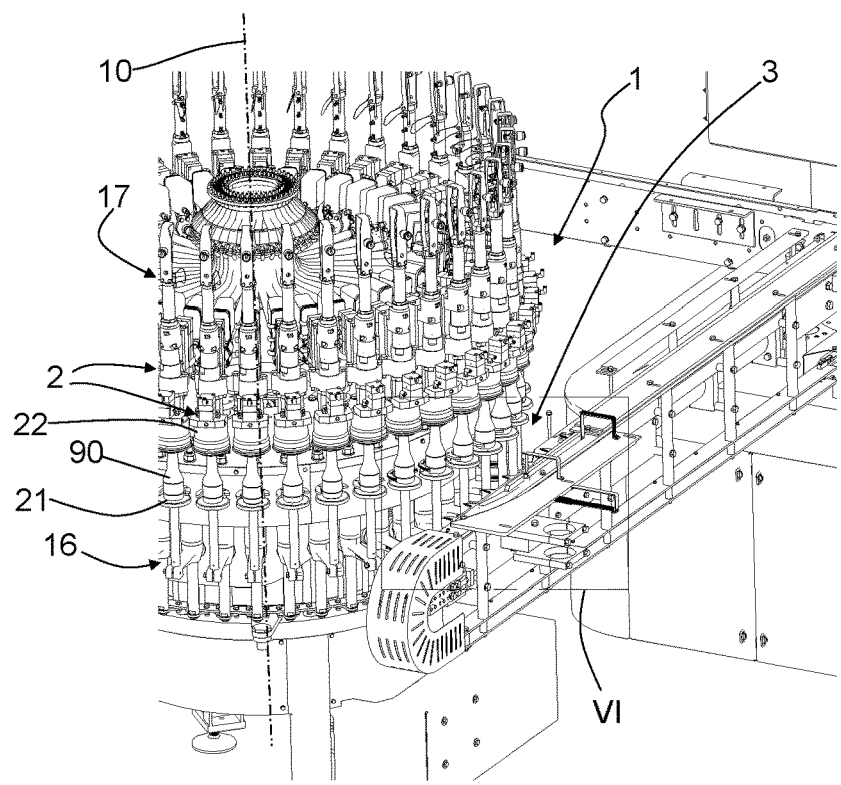
FIG. 5 is a perspective view of a part of the machine of FIG. 1, in the first operating mode.
Figure 6:
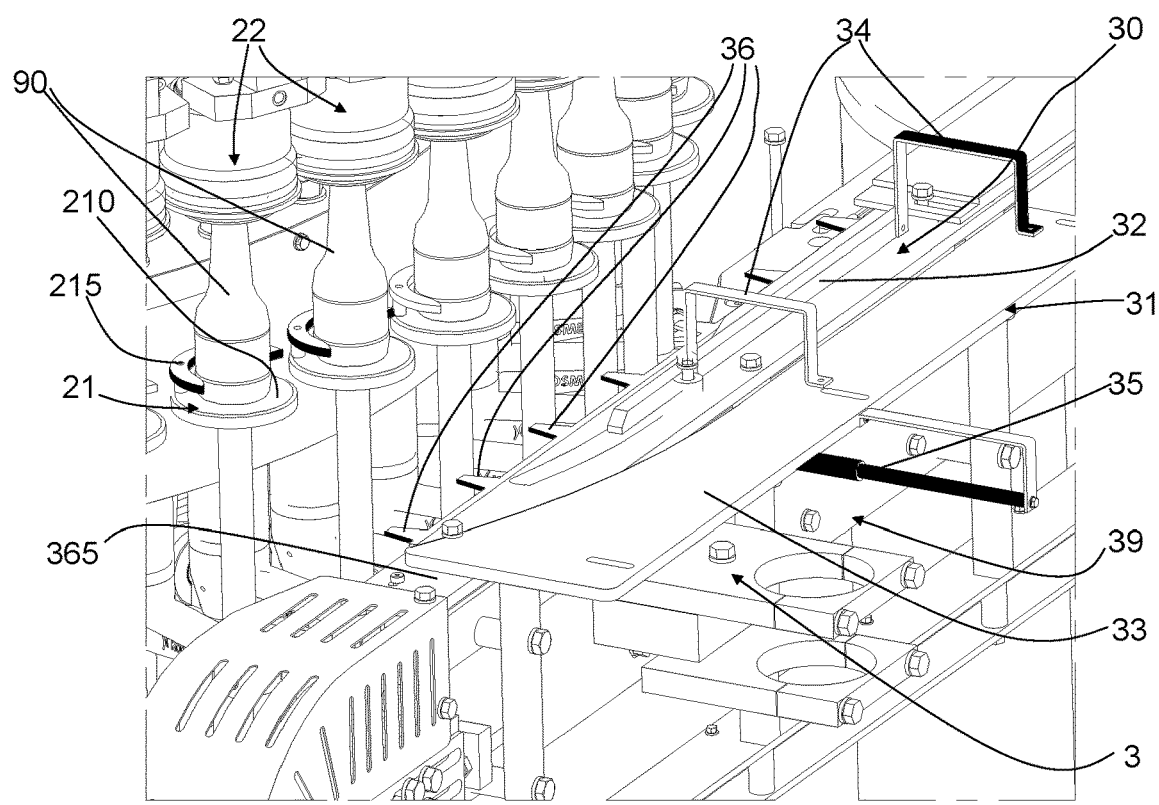
FIG. 6 shows an enlarged detail VI of the part of the machine in FIG. 5.
Figure 7:
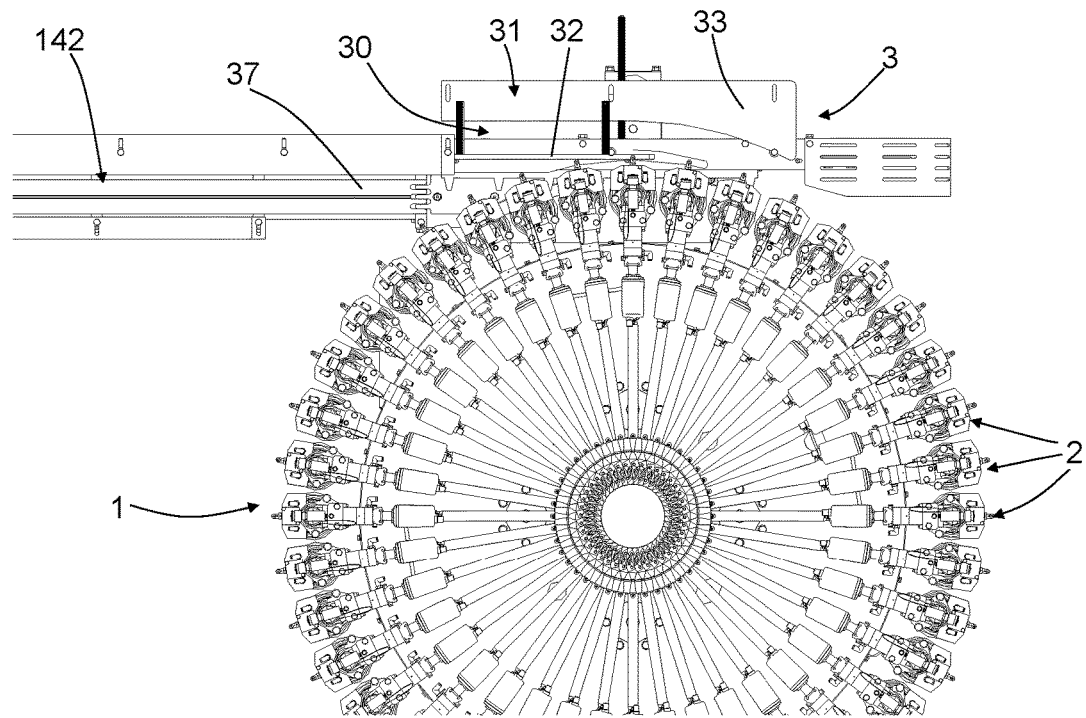
FIG. 7 is a top view of the part of the machine in FIG. 5.
Figure 8:
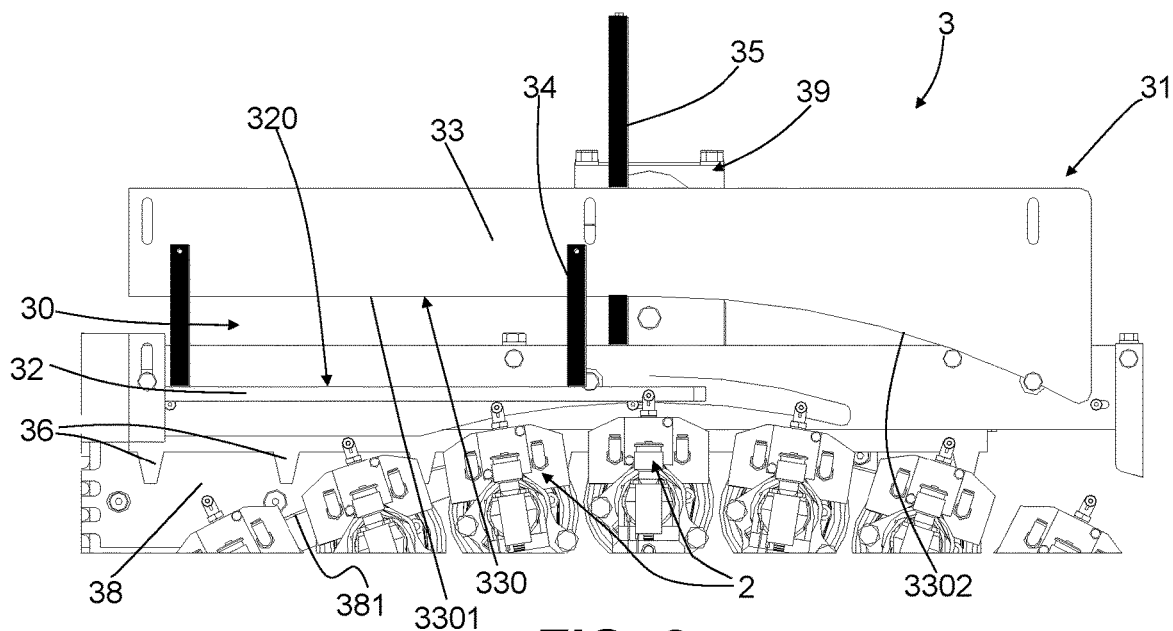
FIG. 8 shows an enlarged detail of FIG. 7.
Figure 12:
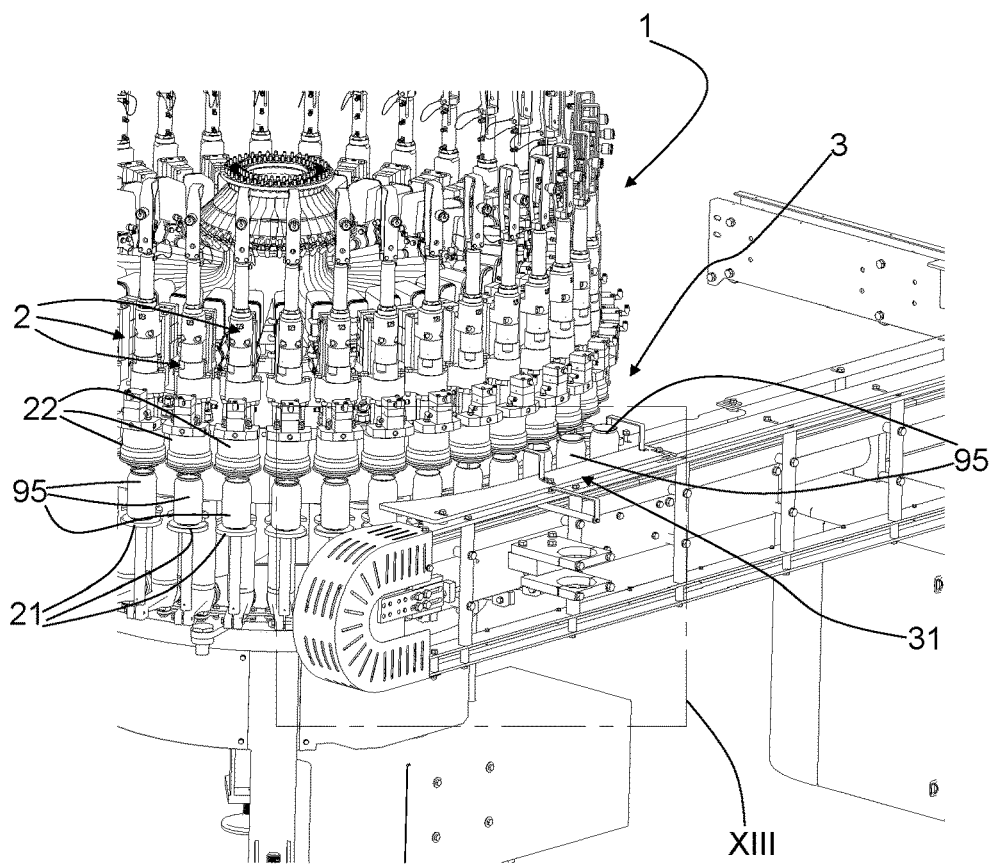
FIG. 12 is a perspective view of a part of the machine of FIG. 1, in the second operating mode.
Figure 13:
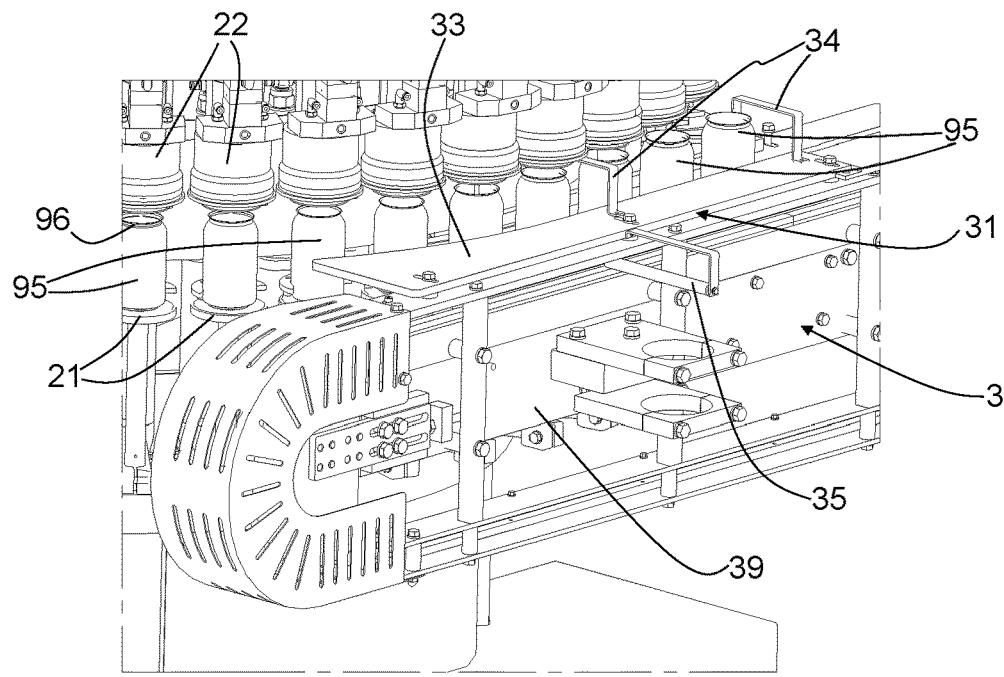
FIG. 13 shows an enlarged detail XIII of the part of the machine in FIG. 12.
Figure 14:
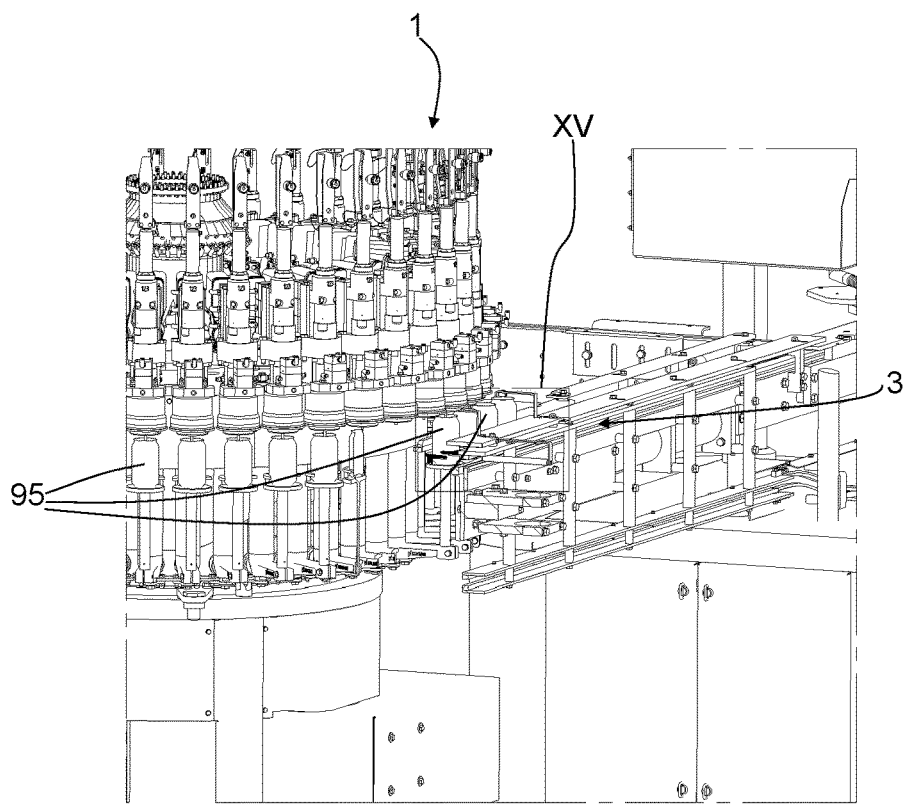
FIG. 14 shows the part of the machine of FIG. 12, partly in cross-section.
Figure 15:
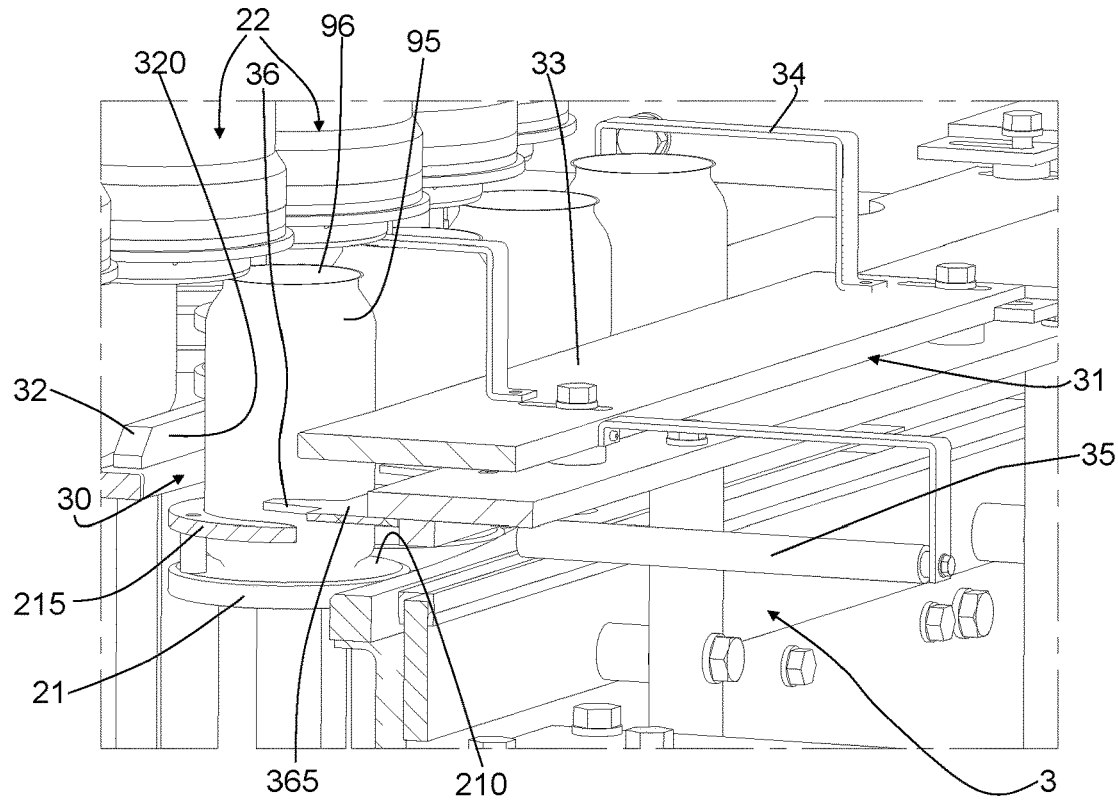
FIG. 15 shows an enlarged detail XV of FIG. 14.
Figure 16:
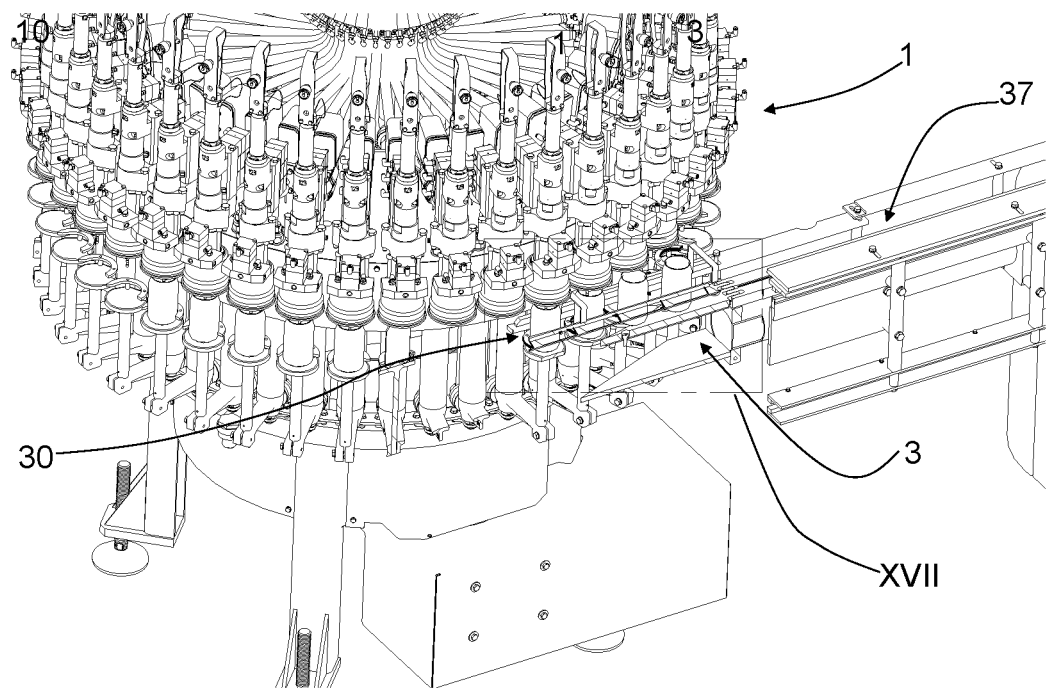
FIG. 16 is another view, partly in cross-section, of the part of the machine of FIG. 12.
Figure 17:
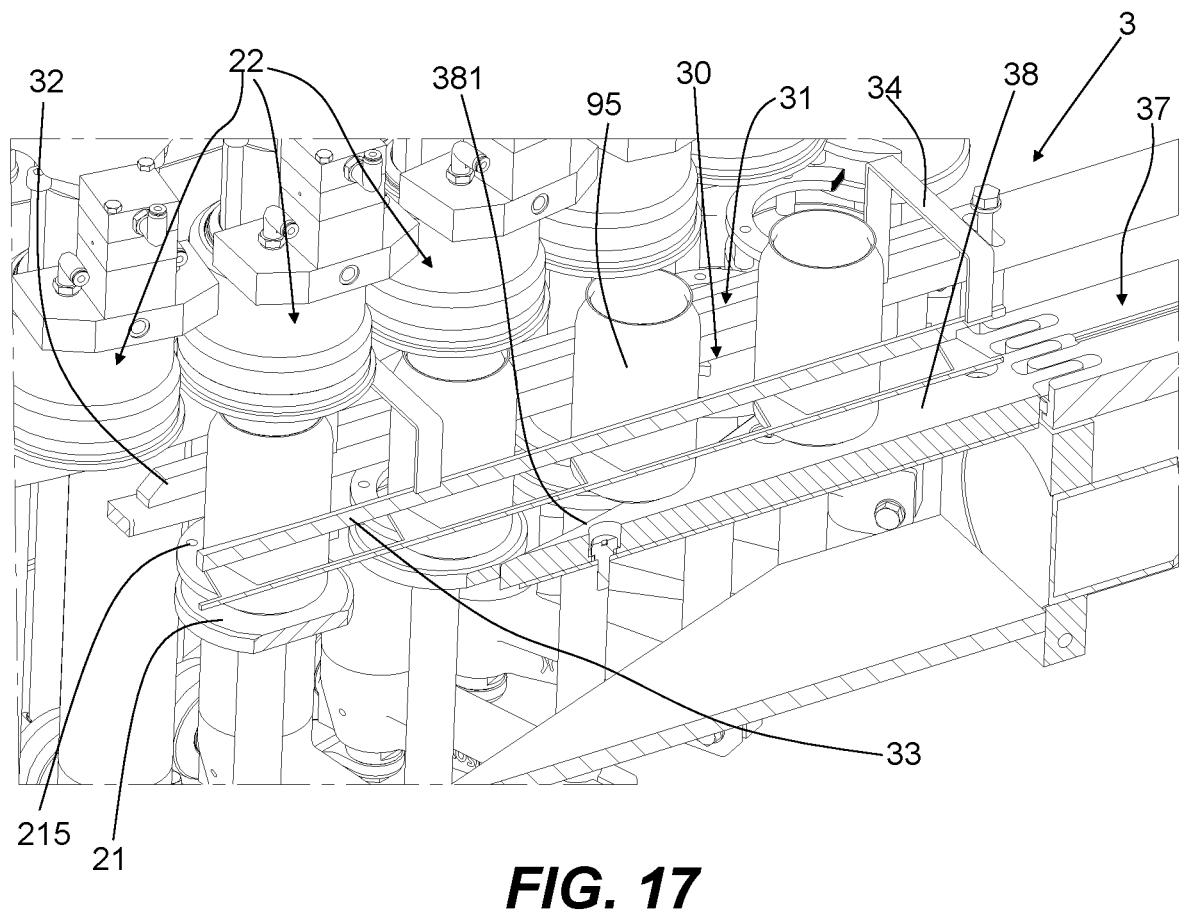
FIG. 17 shows an enlarged detail XVII of FIG. 16.

As shown by a comparison between FIGS. 5 and 12, for the containers 90 of the first type (bottles) the upper part 17 is further from the lower part 16, leaving a travel space for the movement of the plates 21; for the containers 95 of the second type (cans), the upper part 17 is nearer the lower part 16, since a smaller travel space is required (indeed, compared to the first annular gasket 221, the second annular gasket 222 is at a shorter distance from the plate 21 and from the edge of the housing 220). Moreover the bottles usually have a greater height than the cans and therefore that requires a greater distance between the plate 21 and the housing 220 during the filling.

When the machine 100 is used in a first operating mode, that is to say, to fill containers 90 of the first type, the upper part 17 of the carousel filler 1 is translated away from the lower part 16 and therefore the filling heads 22 of the filling units 2 are moved away from the respective plates 21 mounted on the lower part 16; when the machine 100 is used in a second operating mode, that is to say, to fill containers 95 of the second type, the upper part 17 is translated towards the lower part 16 and therefore the filling heads 22 of the filling units 2 are moved towards the respective plates 21.

The carousel filler 1 comprises a system for feeding the liquid substance to the feed ducts 25 of the filling heads 22.

Other details of the operation of the carousel filler 1, which may be similar to the prior art, are not described here and are within the reach of the experts in the field.

The machine 100 also comprises a first device 11 for loading the containers onto the carousel filler 1, a second device 12 for removing the containers 90 of the first type from the carousel filler 1, a third device 3 for removing the containers 95 of the second type from the carousel filler 1.

The first device 11, the second device 12 and the third device 3 are positioned in respective angular positions on the circumferential path 15 of the plates 21. As regards the circumferential path 15, the third device 3 is in an angular position interposed between the first device 11 and the second device 12. For example, a plate 21 passes from the first device 11 to the third device 3 with a 190-degree rotation of the carousel filler 1, whilst it passes from the first device 11 to the second device 12 with a 320-degree rotation.

The third device 3 is configured to assume an operating condition, in which in use it removes the container that is located on a plate 21 passing through its angular position, and a non-operating condition, in which it allows the container on the passing-through plate 21 to continue the path towards the second device 12. The non-operating condition is assumed when the machine 1 processes containers 90 of the first type (FIG. 1 and FIGS. 5 to 11), whilst the operating condition is assumed when the machine 100 processes containers 95 of the second type (FIG. 2 and FIGS. 12 to 20).

For example, the first device 11 is a starwheel device (already known in itself), which is positioned at a supply line 13 for (empty) containers, between the supply line 13 and the carousel filler 1: during the rotation about its axis of rotation, the first starwheel device 11 removes the containers from the supply line 13 and transfers them onto the carousel filler 1 positioning them on the respective plates 21.

In the example, the second device 12 is also a starwheel device (already known in itself), which is positioned between the carousel filler 1 and a first transportation system 141 downstream of the filling: during the rotation about its axis of rotation, the second starwheel device 12 removes the (full) containers from the carousel filler 1 and transfers them to a first transportation system 141.

Figure 2:
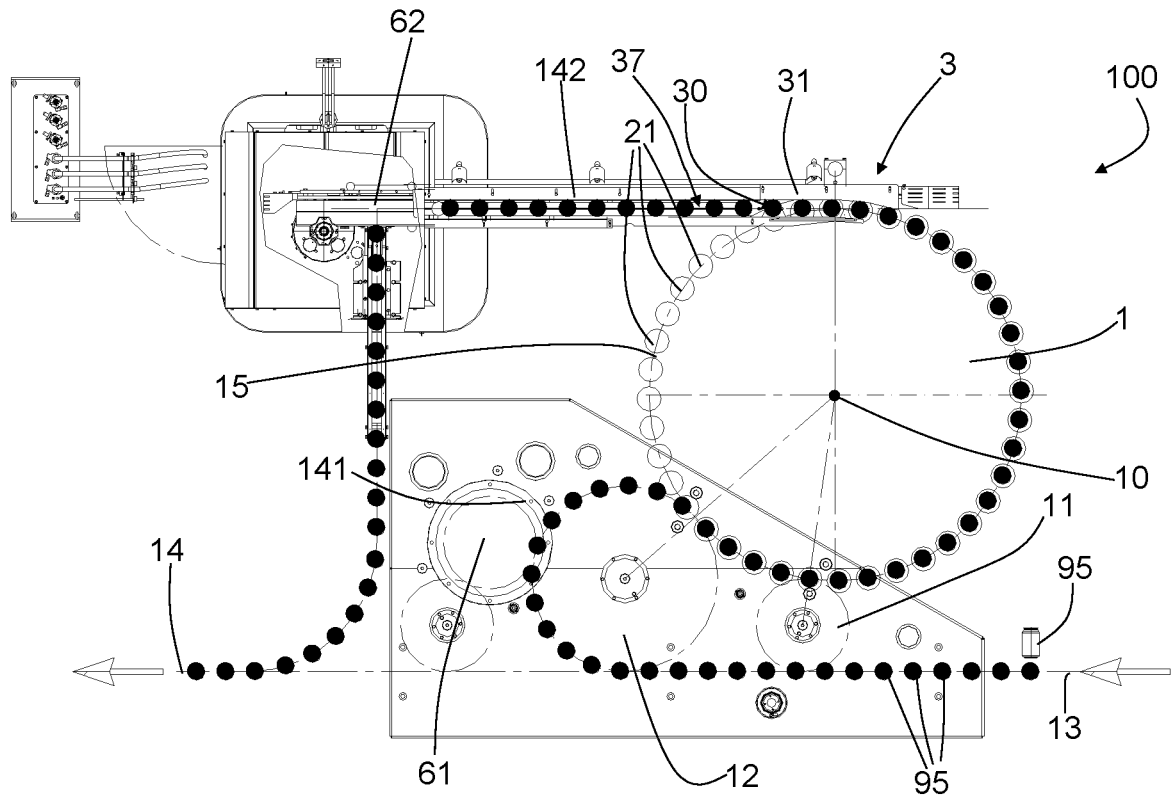
FIG. 2 is a simplified top view of the machine of FIG. 1, in a second operating mode for containers of a second type.
Figure 3:
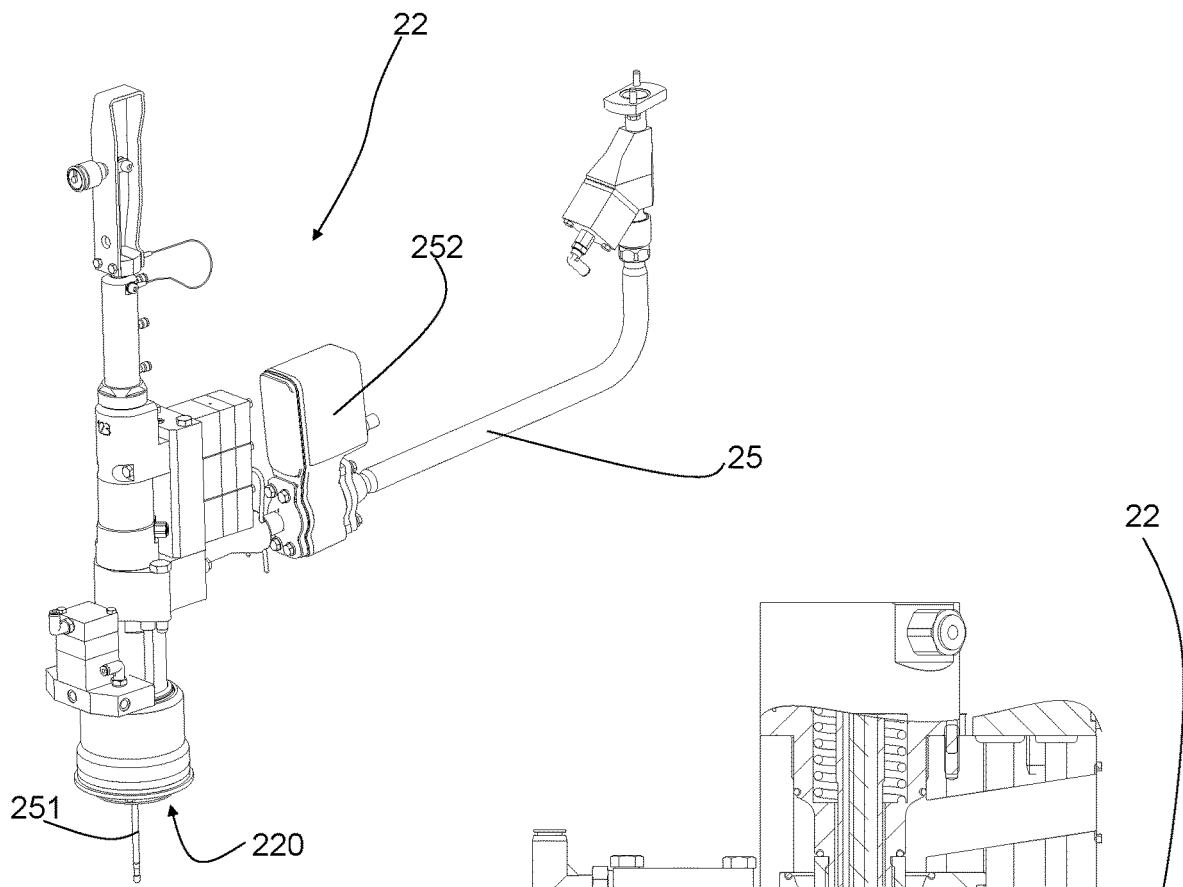
FIG. 3 is a perspective view of a filling head which is part of the machine of FIG. 1.
Figure 4:
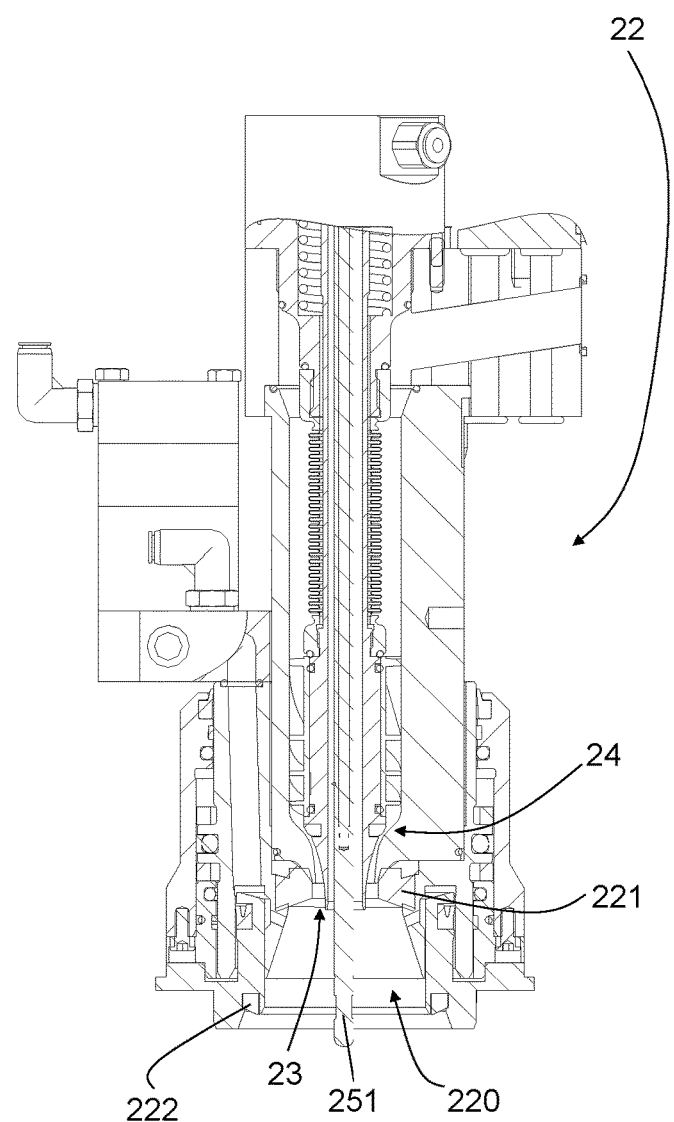
FIG. 4 shows an enlarged detail in cross-section of the filling head of FIG. 3.

In the particular embodiment shown in FIGS. 1 and 2, in the first operating mode the first device 11 is used to load the containers 90 of the first type, which are then removed by the second device 12. In contrast, in the second operating mode, the loading of the containers 95 of the second type is carried out using the second device 12.

Basically, depending on the operating mode, the second device 12 may be used to load or to remove the containers onto/from the carousel filler 1. For this purpose, the second device 12 is also positioned at the supply line 13. The second device 12 is located downstream of the first device 11 along the supply line 13, which is the same for the containers of both types. The first device 11 may be put in an inactive condition, for example by removing the starwheel and positioning border elements which hold the containers in the supply line 13 when the containers pass at the first device 11.

Therefore, depending if the condition of the first device 11 is active or inactive, the containers are removed by the first device 11 or continue beyond and are removed by the second device 12. The direction of rotation of the second starwheel device 12 is the same for removing the containers 90 of the first type and for loading the containers 95 of the second type.

That is advantageous because it allows extension of the path of the containers 95 of the second type in the filler 1, compared to a loading which uses the first device 11. That gives more time for filling of the containers 95 themselves. For example, between the second device 12 and the third device 3 there are 230 degrees of rotation by the filler 1, whilst between the first device 11 and the third device 3 there are 190 degrees. In any case, if preferable, even the containers 95 of the second type may be loaded onto the carousel filler 1 using the first device 11.

Downstream of the carousel filler 1, the machine 100 comprises respective apparatuses for closing the containers: a first closing apparatus 61 for closing the containers 90 of the first type and a second closing apparatus 62 for closing the containers 95 of the second type.

The first transportation system 141 transports the containers 90 removed by the second device 12 to the first closing apparatus 61. If necessary, a section of the first transportation system 141 may be part of the first closing apparatus 61 for closing the containers, as shown in FIG. 1.

A second transport system 142 transports the containers 95 removed by the third device 3 to the second closing apparatus 62.

The paths of the containers downstream of the respective closing apparatuses 61, 62 may converge in a single outfeed line 14. For example, as shown in FIGS. 1 and 2, the supply line 13 (which is an infeed line for the containers) and the outfeed line 14 are aligned with each other, as well as being the same for both types of containers. That is useful for having a machine which is compact and easy to incorporate in a plant, as well as convenient to manage as regards a change in the type of container. For example, the machine 100 in a plan view (as in FIGS. 1 and 2) is contained in a rectangle, in which the long sides are parallel to the infeed line 13, to the outfeed line 14 and to the second transport system 142.

For containers 90 of the first type which are bottles, the first closing apparatus 61 is a capping apparatus. For containers 95 of the second type which are cans, the second closing apparatus 62 is a sealing apparatus, capable of positioning and sealing the lids of the cans.

Such closing apparatuses are already known in themselves and do not require further description here.

Figure 21:
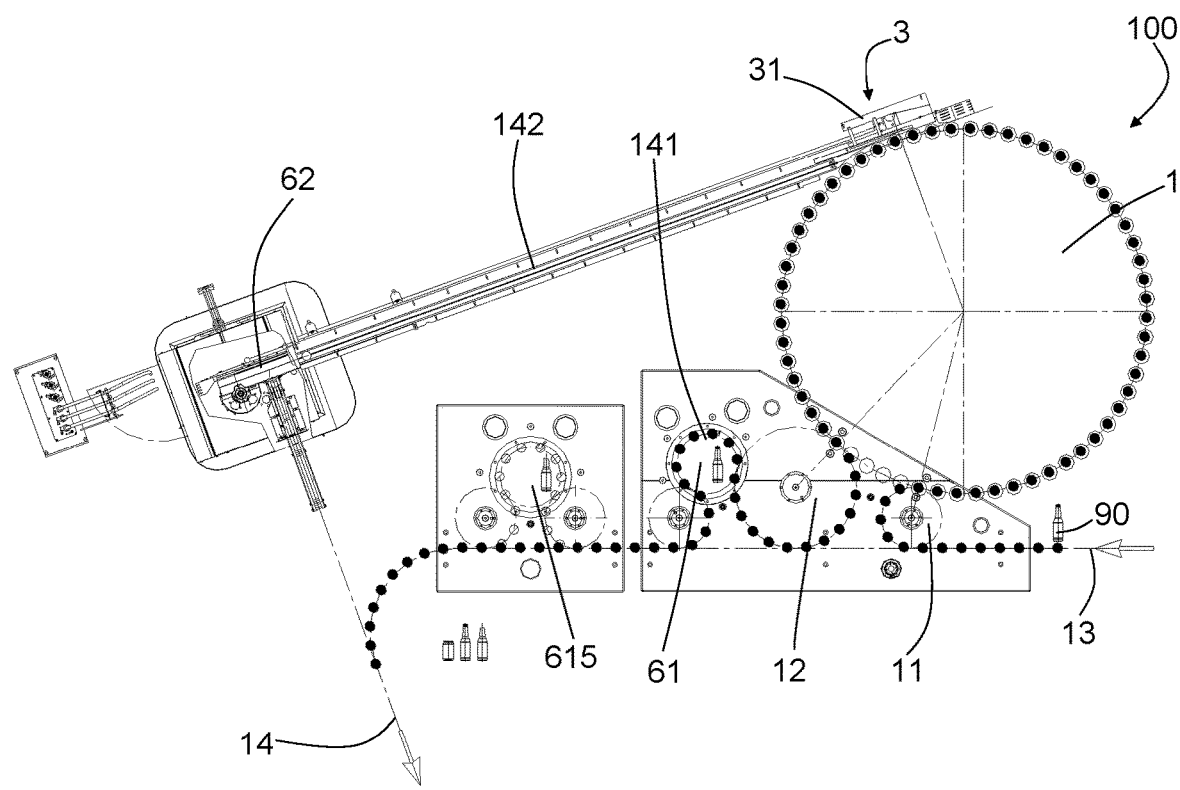
FIG. 21 is a simplified top view of a second embodiment of a machine according to this invention, in a first operating mode for containers of the first type.
Figure 22:
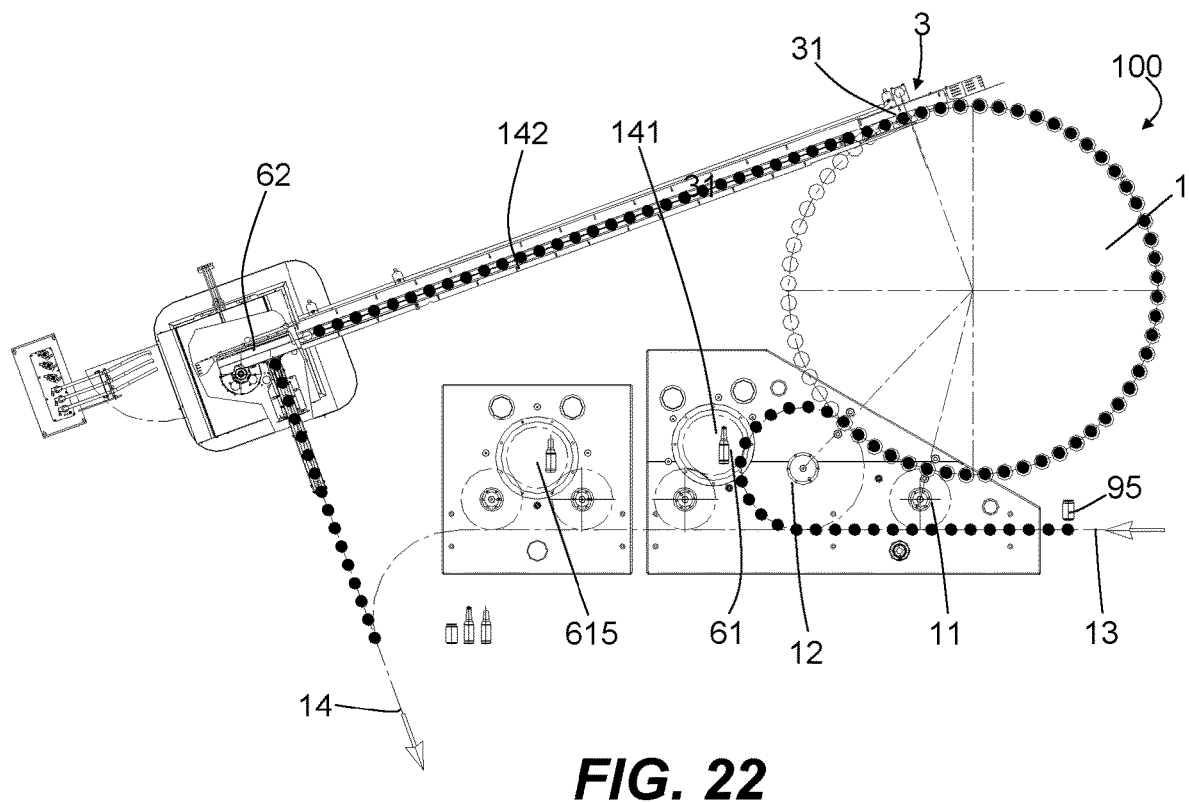
FIG. 22 is a simplified top view of the machine of FIG. 21, in a second operating mode for containers of the second type.

In one alternative embodiment of the machine 100, shown in FIGS. 21 and 22, the infeed line 13 and the outfeed line 14 are not aligned and form an angle between them, for example of 110 degrees. The second transport system 142 is not parallel with the infeed line 13 and, relative to the embodiment of FIGS. 1 and 2, the third device 3 is at a greater angular distance from the first device 11, for example a distance of 215 degrees, and from the second device 12, for example a distance of 245 degrees. In particular the machine 100 in a plan view (as in FIGS. 21 and 22) is contained in a trapezium.

Moreover, in the machine of FIGS. 21 and 22 there are two first closing apparatuses 61, 615 which are positioned one after the other along the first transportation system 141 and can be used alternatively. For example, for containers 90 of the first type which are bottles, they are capping apparatuses which process different bottle formats and/or apply different caps.

The machine 100 of FIGS. 21 and 22, compared to the machine 100 of FIGS. 1 and 2, therefore has the advantage of increasing the working angle for filling and therefore, the diameter of the carousel filler 1 being equal, allowing a greater production speed. Moreover, thanks to the trapezoidal shape in plan view, the machine occupies less space in the rear part where the second closing apparatus 62 is located.

The following is a description of an example embodiment, according to this invention, of the third device 3 for removing the containers 95 of the second type from the carousel filler 1.

The third device 3 comprises a movable body 31 having a conveying lane 30 for the containers. The movable body 31 is movable relative to the carousel filler 1 between an operating position (which corresponds to the operating condition of the third device 3) and a non-operating position (which corresponds to the non-operating condition of the third device 3).

In the operating position, the movable body 31 is positioned close to the carousel filler 1 and the conveying lane 30 is substantially tangential to the circumferential path 15, so that the container on the passing-through plate 21 at the third device 3 enters the conveying lane 30.

Basically, the conveying lane 30 receives the container 95 while the latter is on the plate 21 and prevents the container from continuing the rotation movement about the axis 10 of the carousel filler 1, therefore the container separates from the plate 21 and continues its path along the conveying lane 30 towards the second transport system 142.

In the non-operating position, the movable body 31 is positioned away from the carousel filler 1 and the conveying lane 30 is outside the circumferential path 15, so that it does not interfere with the containers on the plates 21.

The movable body 31 comprises a first elongated element 32 defining an inner border 320 of the conveying lane 30. For example, the first elongated element 32 is a bar or a section bar. The first elongated element 32, in the operating position, is positioned at a greater height than the resting surface 210 of the passing-through plate 21, is at a smaller radial distance from the axis of rotation 10 than the radial distance of the centre of the passing-through plate 21 from the axis of rotation 10, and extends towards the outside of the circumferential path 15.

Basically, the first elongated element 32 is higher than the plate 21 and therefore does not interfere with the movement of the plate 21, which passes below it. The first elongated element 32 is located on the inner side of the container on the plate 21 and extends towards the outside intersecting the circumferential path 15: the first elongated element 32 is interposed between the container and the axis of rotation 10 and therefore the container goes against the first elongated element 32 and is then guided by the latter in a direction towards the outside of the circumferential path 15.

In other words: the container 95 on the passing-through plate 21 comes into contact with the first elongated element 32, which prevents the container 95 from continuing along the circumferential path 15 and keeps it in the conveying lane 30.

The movable body 31 further comprises a second elongated element 33 that defines an outer border 330 of the conveying lane 30 and is at least partly parallel with the first elongated element 32. The second elongated element 33, for example, is a plate and has an edge facing towards the first elongated element 32, that edge forming the outer border 330. The terms "inner" and "outer" shall be interpreted relative to the axis of rotation 10 and to the circumferential path 15: the inner border 320 is the one closest to the axis 10 and is partly between the circumferential path 15 and the axis 10, the outer border 330 is the one furthest from the axis 10; the same applies for the inner side or the outer side of the container.

In the operating position, the second elongated element 33 is at a greater radial distance from the axis of rotation 10 than the radial distance of the centre of the passing-through plate 21 from the axis of rotation 10. In other words, the second elongated element 33 is further out than the first elongated element 32 and is located on the outer side of the container 95 on the plate 21: in use, the container 95 in the conveying lane 30 is interposed between the first elongated element 32 and the second elongated element 33. Basically, the second elongated element 33 prevents the container 95 from being able to fall outwards from the carousel filler 1.

The inner border 320 and the outer border 330 are substantially at the same height and parallel. When the movable body 31 is in the operating position, the centre line between them is substantially tangential to the circumferential path which the centre of the plate 21 follows. The distance between the inner border 320 and the outer border 330 corresponds (with the necessary excess tolerances) to the diameter of the container 95 to be removed.

The outer border 330 has a first section 3301 which is parallel with the inner border 320 and, upstream of that first section 3301, the outer border 330 may have a second section 3302 which is curved or inclined. That second section 3302 precedes the entrance of the conveying lane 30 externally following the path of the container and therefore acts as a guide for container infeed into the conveying lane 30.

The first elongated element 32 is fixed to the second elongated element 33 by brackets 34, having an inverted C shape, which pass above the containers 95 and therefore do not interfere with the latter.

The movable body 31, which essentially is a carriage formed by the elongated elements 32, 33 and by the brackets 34, is slidably mounted on a fixed part 39 of the third device 3. The movement of the movable body 31 between the operating position and the non-operating position is driven by one or more actuators 35, which for example are hydraulic cylinders. In particular, the movement of the movable body 31 is a radial translation relative to the axis of rotation 10 of the carousel filler 1.

In order to help the container 95 to move forward along the conveying lane 30, the third device 3 comprises prongs 36 that, at least in the operating condition, protrude into the conveying lane 30, are spaced apart from each other and are movable along the conveying lane 30. The prongs 36 are moved along the conveying lane 30 by a motion system which is configured to move the prongs 36 in a coordinated manner with the rotation of the carousel filler 1, so that in use the prongs 36 push respective containers 95 along the conveying lane 30. Basically, the prongs 36 are spaced apart from each other in such a way that they are inserted between one container 95 and another and their speed substantially corresponds to the tangential speed of the containers 95 on the plates 21. When the container 95 has left the passing-through plate 21, the container 95 is pushed along the conveying lane 30 by a respective prong 36.

Specifically the prongs 36 are projections which are part of a conveyor belt 365 which in turn is part of the second transport system 142 which brings the containers 95 to the second closing apparatus 62.

The conveyor belt 365 extends in a loop between the third device 3 and the second closing apparatus 62; the motion system makes the belt 365 and the prongs 36 move forward, also making the containers 95 move forward in the conveying lane 30 and in a subsequent path 37 towards the second closing apparatus 62.

When the movable body 31 is in the operating position the conveying lane 30 and the subsequent path 37 are aligned with each other, whilst in the non-operating position the conveying lane 30 is misaligned outside the path 37.

In the embodiment shown, the third device 3 comprises a resting surface 38 for the container 95 removed: when the movable body 31 is in the operating position, the resting surface 38 has a portion that is located in the conveying lane 30 and forms a bottom of the conveying lane 30. That portion of the resting surface 38 is substantially at the same height as the resting surface 210 of the passing-through plate 21 and has an edge 381 that is curved or inclined. The edge 381 is brushed by the passing-through plate 21 as the carousel filler 1 rotates, so as to offer a resting surface for the container 95 moving away from the passing-through plate 21. In other words, the plate 21 passes very close to the curved edge 381 and, since the resting surface 38 is at the same height as the plate 21, the container 95 can pass from the plate 21 to the resting surface 38 without hindrance and without risking falling (see in particular FIG. 17). Basically, the bottom of the conveying lane 30 is constituted partly of the moving plates 21 and partly of said resting surface 38. The resting surface 38, on the side downstream of the curved edge 381, is joined to the subsequent path 37 of the second transport system 142 which leads to the second closing apparatus 62. The resting surface 38 is the top face of an element which is fixed relative to the fixed part 39 of the third device 3 and is not mounted on the movable body 31.

Moreover, in the embodiment shown, each plate 21 comprises a centring element 215, that is at a greater height than the resting surface 210 of the plate 21 and has a C-shape. The centring element 215, with its C-shape, defines a seat for receiving the container in a position centred on the plate 21 and also laterally retains the container. The seat opens radially outwards, that is to say, the opening of the C-shape faces outwards and, when it enters the conveying lane 30 of the third device 3, it faces towards the outer border 330. The opening of the seat has a size and an angular position which allow the container to be inserted into the seat at the first device 11 (and also at the second device 12) and allow the container 95 to go out of the seat into the conveying lane 30 of the third device 3. Since the centring element 215 is fixed relative to the plate 21 and rotates with it about the axis 10, during the rotation the opening of the seat is positioned with a different angle relative to the centre line of the conveying lane 30, which is tangential to the circumferential path 15: the opening of the seat initially faces towards the outer border 330, completely blocking container translation, and gradually rotates (basically, it follows the curved edge 381 of the resting surface 38) and releases the container.

When the machine 100 is used for the containers 90 of the first type (bottles, for example), the movable body 31 is in the non-operating position and also the plates 21 are in the raised position when they arrive at the third device 3 (see in particular FIGS. 9 and 10). Therefore, the plates 21 and the containers 90 do not interact in any way with the third device 3 and they continue the circumferential path 15 towards the second device 12, where they are removed.

When the machine 100 is used for the containers 95 of the second type (cans, for example), the movable body 31 is in the operating position and the plates 21 are in the lowered position (see in particular FIGS. 18 and 19). Therefore, the containers 95 interfere with the third device 3 and are removed thanks to the interaction with the first elongated element 32 and removed from the plates 21.

Obviously, in the carousel filler 1 the container is filled with the liquid substance in the section of circumferential path 15 between loading and removal.

It seems evident that, in the machine according to this invention, the switch from one operating mode to the other operating mode depending on production requirements does not require complex operations on the machine and can be performed quickly. With a simple movement of the movable body 31 it is possible to configure the machine 100 for sending the bottles 90 to the capping apparatus 61 or for sending the cans 95 to the sealing apparatus 62. The machine downtime is extremely short. Moreover, the machine 100 has a compact structure which does not take up much room.

The invention described above may be modified and adapted in several ways without thereby departing from the scope of the inventive concept set out in the attached claims.

All details may be substituted with other technically equivalent elements and the materials used, as well as the shapes and dimensions of the various components, may vary according to requirements.

The invention claimed is:

1. A machine (100) for filling containers with a liquid substance, the containers to be filled being containers (90) of a first type or containers (95) of a second type, the machine (100) being configured to operate in a first operating mode to fill the containers (90) of the first type and being configured to operate in a second operating mode to fill the containers (95) of the second type,
wherein the machine (100) comprises:
a carousel filler (1), rotatable about an axis of rotation (10) and equipped with a plurality of filling units (2);
a first device (11) for loading the containers to be filled onto the carousel filler (1);
a second device (12) for removing the containers (90) of the first type from the carousel filler (1); and
a third device (3) for removing the containers (95) of the second type from the carousel filler (1);
the filling units (2) being configured to fill the containers (90) of the first type when the machine (100) operates in the first operating mode and to fill the containers (95) of the second type when the machine (100) operates in the second operating mode,
wherein each filling unit (2) comprises a plate (21), which forms a resting surface (210) for a bottom of one of the containers to be filled, and a filling head (22) that is configured to receive a mouth of that container to be filled and to dispense the liquid substance towards an internal volume of that container to be filled, the filling head (22) being configured to receive the mouth of one container (90) of the first type and, alternatively, the mouth of one container (95) of the second type, wherein the filling heads (22) and the respective plates (21) are positioned on a periphery of the carousel filler (1) and, as the carousel filler (1) rotates about the axis of rotation (10), they move along a circumferential path (15) about the axis of rotation (10), wherein the first device (11), the second device (12) and the third device (3) are positioned in respective angular positions on said circumferential path (15), relative to which the third device (3) is in an angular position interposed between the first device (11) and the second device (12), the third device (3) being configured to assume an operating condition, in which, in use, the third device (3) removes the container that is located on a passing-through plate, the passing-through plate being one of the plates (21) which is passing through the angular position of the third device (3), the third device (3) being configured to assume a non-operating condition, in which, in use, the third device (3) allows the container located on the passing-through plate to continue along the circumferential path (15) towards the second device (12), wherein the third device (3) comprises a movable body (31) and a conveying lane (30) for the containers, the conveying lane (30) being made in the movable body (31) so that the conveying lane (30) is movable with the movable body (31), wherein, in the operating condition, the movable body (31) is positioned close to the carousel filler (1) and the conveying lane (30) is substantially tangential to the circumferential path (15) so that the container located on the passing-through plate enters the conveying lane (30), and wherein, in the non-operating condition, the movable body (31) is positioned away from the carousel filler (1) and the conveying lane (30) is outside the circumferential path (15).

2. The machine (100) according to claim 1, wherein the movable body (31) comprises an elongated element (32) defining an inner border (320) of the conveying lane (30), wherein, in the operating condition, the elongated element (32) is positioned at a greater height than the resting surface (210) of the passing-through plate, is at a smaller radial distance from the axis of rotation (10) than a radial distance of a centre of the passing-through plate from the axis of rotation (10), and extends towards an outside of the circumferential path (15), whereby the container located on the passing-through plate comes into contact with the elongated element (32) and the elongated element (32) prevents the container from continuing along the circumferential path (15) and keeps the container in the conveying lane (30).

3. The machine (100) according to claim 2, wherein said elongated element (32) is a first elongated element and the movable body (31) comprises a second elongated element (33) that defines an outer border (330) of the conveying lane (30), the outer border (330) being at least partly parallel with the inner border (320), wherein, in the operating condition, the second elongated element (33) is at a greater radial distance from the axis of rotation (10) than the radial distance of the centre of the passing-through plate from the axis of rotation (10), so that, in use, the container in the conveying lane (30) is interposed between the first elongated element (32) and the second elongated element (33).

4. The machine (100) according to claim 1, wherein the third device (3) comprises prongs (36) that, at least in the operating condition, protrude into the conveying lane (30), are spaced apart from each other and are movable along the conveying lane (30), a motion system being configured to move the prongs (36) in a coordinated manner with a rotation of the carousel filler (1) about the axis of rotation (10) so that, in use, the prongs (36) push respective containers along the conveying lane (30).

5. The machine (100) according to claim 1, wherein the third device (3) comprises a resting surface (38) for a container removed from the carousel filler (1), wherein, in the operating condition, the resting surface (38) of the third device (3) has a portion that is located in the conveying lane (30) and is substantially at a same height as the resting surface (210) of the passing-through plate, wherein said portion forms a bottom of the conveying lane (30) and has a curved or inclined edge (381) that is brushed by the passing-through plate as the carousel filler (1) rotates, so as to offer a surface for resting the container moving away from the passing-through plate.

6. The machine (100) according to claim 1, wherein each plate (21) comprises a centring element (215) that is at a greater height than the resting surface (210) of the plate (21) and has a C-shape that defines a C-shaped seat for receiving the container, the C-shaped seat having an opening that is open radially outwards, opening's size and opening's angular position being such as to allow the container to be inserted into the C-shaped seat at the first device (11) and to allow the container to go out of the C-shaped seat into the conveying lane (30) of the third device (3).

7. The machine (100) according to claim 1, wherein the second device (12) for removing the containers (90) of the first type can be used, when the machine (100) operates in the second operating mode, to load the containers (95) of the second type onto the carousel filler (1), the second device (12) being positioned at a container supply line (13).

8. The machine (100) according to claim 1, wherein the first device (11) is a starwheel device and/or the second device (12) is a starwheel device.

9. The machine (100) according to claim 1, comprising a first closing apparatus (61) for closing the containers (90) of the first type and a second closing apparatus (62) for closing the containers (95) of the second type, a first transportation system (141) configured to transport the containers removed by the second device (12) to the first closing apparatus (61) for closing the containers, a second transport system (142) configured to transport the containers removed by the third device (3) to the second closing device (62) for closing the containers.

10. The machine (100) according to claim 1, which can be used for filling bottles and for filling cans, the containers (90) of the first type being bottles and the containers (95) of the second type being cans.

11. The machine (100) according to claim 1, wherein the non-operating condition of the third device (3) is assumed when the machine (100) operates in the first operating mode and wherein the operating condition of the third device (3) is assumed when the machine (100) operates in the second operating mode, wherein a path of the containers in the machine (100) is modified by acting on the third device (3), depending on the containers to be filled being the containers (90) of the first type or being the containers (95) of the second type.

12. A machine (100) for filling containers with a liquid substance, the containers to be filled being containers (90) of a first type or containers (95) of a second type, the machine (100) being configured to operate in a first operating mode to fill the containers (90) of the first type and being configured to operate in a second operating mode to fill the containers (95) of the second type, wherein the machine (100) comprises:
a carousel filler (1), rotatable about an axis of rotation (10) and equipped with a plurality of filling units (2);
a first device (11) for loading the containers to be filled onto the carousel filler (1);
a second device (12) for removing the containers (90) of the first type from the carousel filler (1); and
a third device (3) for removing the containers (95) of the second type from the carousel filler (1);
the filling units (2) being configured to fill the containers (90) of the first type when the machine (100) operates in the first operating mode and to fill the containers (95) of the second type when the machine (100) operates in the second operating mode,
wherein each filling unit (2) comprises a plate (21), which forms a resting surface (210) for a bottom of one of the containers to be filled, and a filling head (22) that is configured to receive a mouth of that container to be filled and to dispense the liquid substance towards an internal volume of that container to be filled,
the filling head (22) being configured to receive the mouth of one container (90) of the first type and, alternatively, the mouth of one container (95) of the second type,
wherein the filling heads (22) and the respective plates (21) are positioned on a periphery of the carousel filler (1) and, as the carousel filler (1) rotates about the axis of rotation (10), they move along a circumferential path (15) about the axis of rotation (10),
wherein the first device (11), the second device (12) and the third device (3) are positioned in respective angular positions on said circumferential path (15), relative to which the third device (3) is in an angular position interposed between the first device (11) and the second device (12), the third device (3) being configured to assume an operating condition, in which, in use, the third device (3) removes the container that is located on a passing-through plate, the passing-through plate being one of the plates (21) which is passing through the angular position of the third device (3), the third device (3) being configured to assume a non-operating condition, in which, in use, the third device (3) allows the container located on the passing-through plate to continue along the circumferential path (15) towards the second device (12),
wherein the third device (3) comprises a movable body (31) having a conveying lane (30) for the containers, wherein, in the operating condition, the movable body (31) is positioned close to the carousel filler (1) and the conveying lane (30) is substantially tangential to the circumferential path (15) so that the container located on the passing-through plate enters the conveying lane (30), and wherein, in the non-operating condition, the movable body (31) is positioned away from the carousel filler (1) and the conveying lane (30) is outside the circumferential path (15),
wherein the third device (3) comprises prongs (36) that, at least in the operating condition, protrude into the conveying lane (30), are spaced apart from each other and are movable along the conveying lane (30), a motion system being configured to move the prongs (36) in a coordinated manner with a rotation of the carousel filler (1) about the axis of rotation (10) so that, in use, the prongs (36) push respective containers along the conveying lane (30).

13. A machine (100) for filling containers with a liquid substance, the containers to be filled being containers (90) of a first type or containers (95) of a second type, the machine (100) being configured to operate in a first operating mode to fill the containers (90) of the first type and being configured to operate in a second operating mode to fill the containers (95) of the second type, wherein the machine (100) comprises:
a carousel filler (1), rotatable about an axis of rotation (10) and equipped with a plurality of filling units (2);
a first device (11) for loading the containers to be filled onto the carousel filler (1);
a second device (12) for removing the containers (90) of the first type from the carousel filler (1); and
a third device (3) for removing the containers (95) of the second type from the carousel filler (1);
the filling units (2) being configured to fill the containers (90) of the first type when the machine (100) operates in the first operating mode and to fill the containers (95) of the second type when the machine (100) operates in the second operating mode,
wherein each filling unit (2) comprises a plate (21), which forms a resting surface (210) for a bottom of one of the containers to be filled, and a filling head (22) that is configured to receive a mouth of that container to be filled and to dispense the liquid substance towards an internal volume of that container to be filled,
the filling head (22) being configured to receive the mouth of one container (90) of the first type and, alternatively, the mouth of one container (95) of the second type,
wherein the filling heads (22) and the respective plates (21) are positioned on a periphery of the carousel filler (1) and, as the carousel filler (1) rotates about the axis of rotation (10), they move along a circumferential path (15) about the axis of rotation (10),
wherein the first device (11), the second device (12) and the third device (3) are positioned in respective angular positions on said circumferential path (15), relative to which the third device (3) is in an angular position interposed between the first device (11) and the second device (12), the third device (3) being configured to assume an operating condition, in which, in use, the third device (3) removes the container that is located on a passing-through plate, the passing-through plate being one of the plates (21) which is passing through the angular position of the third device (3), the third device (3) being configured to assume a non-operating condition, in which, in use, the third device (3) allows the container located on the passing-through plate to continue along the circumferential path (15) towards the second device (12),
wherein the third device (3) comprises a movable body (31) having a conveying lane (30) for the containers, wherein, in the operating condition, the movable body (31) is positioned close to the carousel filler (1) and the conveying lane (30) is substantially tangential to the circumferential path (15) so that the container located on the passing-through plate enters the conveying lane (30), and wherein, in the non-operating condition, the movable body (31) is positioned away from the carousel filler (1) and the conveying lane (30) is outside the circumferential path (15), wherein the third device (3) comprises a resting surface (38) for a container removed from the carousel filler (1), wherein, in the operating condition, the resting surface (38) of the third device (3) has a portion that is located in the conveying lane (30) and is substantially at a same height as the resting surface (210) of the passing-through plate, wherein said portion forms a bottom of the conveying lane (30) and has a curved or inclined edge (381) that is brushed by the passing-through plate as the carousel filler (1) rotates, so as to offer a surface for resting the container moving away from the passing-through plate.

14. The machine (100) according to claim 13, wherein the movable body (31) comprises an elongated element (32) defining an inner border (320) of the conveying lane (30),
  wherein, in the operating condition, the elongated element (32) is positioned at a greater height than the resting surface (210) of the passing-through plate, is at a smaller radial distance from the axis of rotation (10) than a radial distance of a centre of the passing-through plate from the axis of rotation (10), and extends towards an outside of the circumferential path (15), whereby the container located on the passing-through plate comes into contact with the elongated element (32) and the elongated element (32) prevents the container from continuing along the circumferential path (15) and keeps the container in the conveying lane (30).

15. The machine (100) according to claim 14, wherein said elongated element (32) is a first elongated element and the movable body (31) comprises a second elongated element (33) that defines an outer border (330) of the conveying lane (30), the outer border (330) being at least partly parallel with the inner border (320),
  wherein, in the operating condition, the second elongated element (33) is at a greater radial distance from the axis of rotation (10) than the radial distance of the centre of the passing-through plate from the axis of rotation (10), so that, in use, the container in the conveying lane (30) is interposed between the first elongated element (32) and the second elongated element (33).

* * * * *